(12) United States Patent
Stewart et al.

(10) Patent No.: US 11,673,435 B2
(45) Date of Patent: Jun. 13, 2023

(54) CONFIGURING A TIRE MONITORING SYSTEM

(71) Applicant: SENSATA TECHNOLOGIES, INC., Attleboro, MA (US)

(72) Inventors: William D. Stewart, Antrim (GB); Andrew Burgess, Ballynahinch (IE)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 549 days.

(21) Appl. No.: 16/829,354

(22) Filed: Mar. 25, 2020

(65) Prior Publication Data

US 2021/0300131 A1 Sep. 30, 2021

(51) Int. Cl.
*B60C 23/04* (2006.01)
*G01M 17/02* (2006.01)

(52) U.S. Cl.
CPC ...... *B60C 23/0488* (2013.01); *B60C 23/0415* (2013.01); *B60C 23/0447* (2013.01); *B60C 23/0491* (2013.01); *G01M 17/02* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0647; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489;

(Continued)

(56) References Cited

U.S. PATENT DOCUMENTS 7,404,317 B2 7/2008 Mancosu et al.
7,945,361 B2 5/2011 Brusarosco et al.
(Continued)

FOREIGN PATENT DOCUMENTS

FR 2910662 A1 * 6/2008 ........... B60C 99/006

*Primary Examiner* — Andre J Allen
(74) *Attorney, Agent, or Firm* — Mark H. Williams

(57) ABSTRACT

Methods, apparatuses, systems, and computer program products for configuring a tire monitoring system are disclosed. In a particular embodiment, configuring a tire monitoring system includes determining a model identifier for a tire; identifying, in a database, one or more stiffness coefficients corresponding to the model identifier of the tire; and transmitting the one or more stiffness coefficients to a component of the tire monitoring system.

24 Claims, 12 Drawing Sheets

(58) Field of Classification Search
CPC ............... B60C 25/002; B60C 29/064; B60C 23/00363; B60C 11/0318; B60C 23/0459; B60C 23/0471; B60C 23/0481; B60C 2019/0015; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8
See application file for complete search history.

(56) References Cited

U.S. PATENT DOCUMENTS

| | | | |
|---|---|---|---|
| 2015/0057873 A1* | 2/2015 | Lammers | B60C 23/008 701/29.7 |
| 2018/0094996 A1* | 4/2018 | Yu | B60C 23/0452 |
| 2021/0134082 A1* | 5/2021 | Wilgar | G07C 5/008 |
| 2021/0302272 A1* | 9/2021 | Wilgar | G01P 15/165 |
| 2022/0055420 A1* | 2/2022 | Bill | B60C 23/0479 |
| 2022/0086934 A1* | 3/2022 | Bill | B60C 23/0461 |

* cited by examiner

CONFIGURING A TIRE MONITORING SYSTEM

BACKGROUND

Tire mounted sensors (TMS) may be used to calculate various tire features, including load on a tire. These tire features may be affected by many variables, including the stiffness of the tire. However, the degree of stiffness of a tire may vary across tire models.

SUMMARY

Methods, apparatuses, systems, and computer program products for configuring a tire monitoring system are disclosed. In a particular embodiment, configuring a tire monitoring system includes determining a model identifier for a tire; identifying, in a database, one or more stiffness coefficients corresponding to the model identifier of the tire; and transmitting the one or more stiffness coefficients to a component of the tire monitoring system.

In another embodiment, configuring a tire monitoring system includes determining a model identifier for a tire; identifying, in a database, one or more stiffness coefficients corresponding to the model identifier of the tire; and determining, based on the one or more stiffness coefficients and one or more tire characteristics, a load of the tire.

In another embodiment, configuring a tire monitoring system includes receiving, by a transceiver of a tire mounted sensor (TMS), a signal encoding one or more stiffness coefficients of a tire; storing, by the TMS, the one or more stiffness coefficients in a memory of the TMS; and determining, by the TMS, based on the one or more stiffness coefficients and one or more tire characteristics, a load on the tire.

In another embodiment, configuring a tire monitoring system includes determining, by a tire mounted sensor (TMS) of a tire, that a vehicle is traveling at least at a minimum operational speed; determining, by the TMS, that the vehicle is at a steady operational state; and in response to determining that the vehicle is traveling at least at the minimum operational speed and is at the steady operational state, determining, based on a deformation of the tire at a road contact surface, one or more stiffness coefficients, and one or more tire characteristics, a load on the tire.

As will be explained below, one of the benefits of configuring a tire monitoring system according to embodiments of the present disclosure is that the tire mounted sensors of the tire monitoring system can be programmed with tire-specific stiffness coefficients, improving the accuracy of measurements made by the tire mounted sensors. Another benefit of at least one embodiment of the present disclosure is that the tire mounted sensors can be programmed after installation in a tire, eliminating the need to replace tire mounted sensors to achieve updated performance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Exemplary methods, apparatuses, systems, and computer program products for configuring a tire monitoring system in accordance with the present disclosure are described with reference to the accompanying drawings, beginning with FIG. 1.

Figure 1:
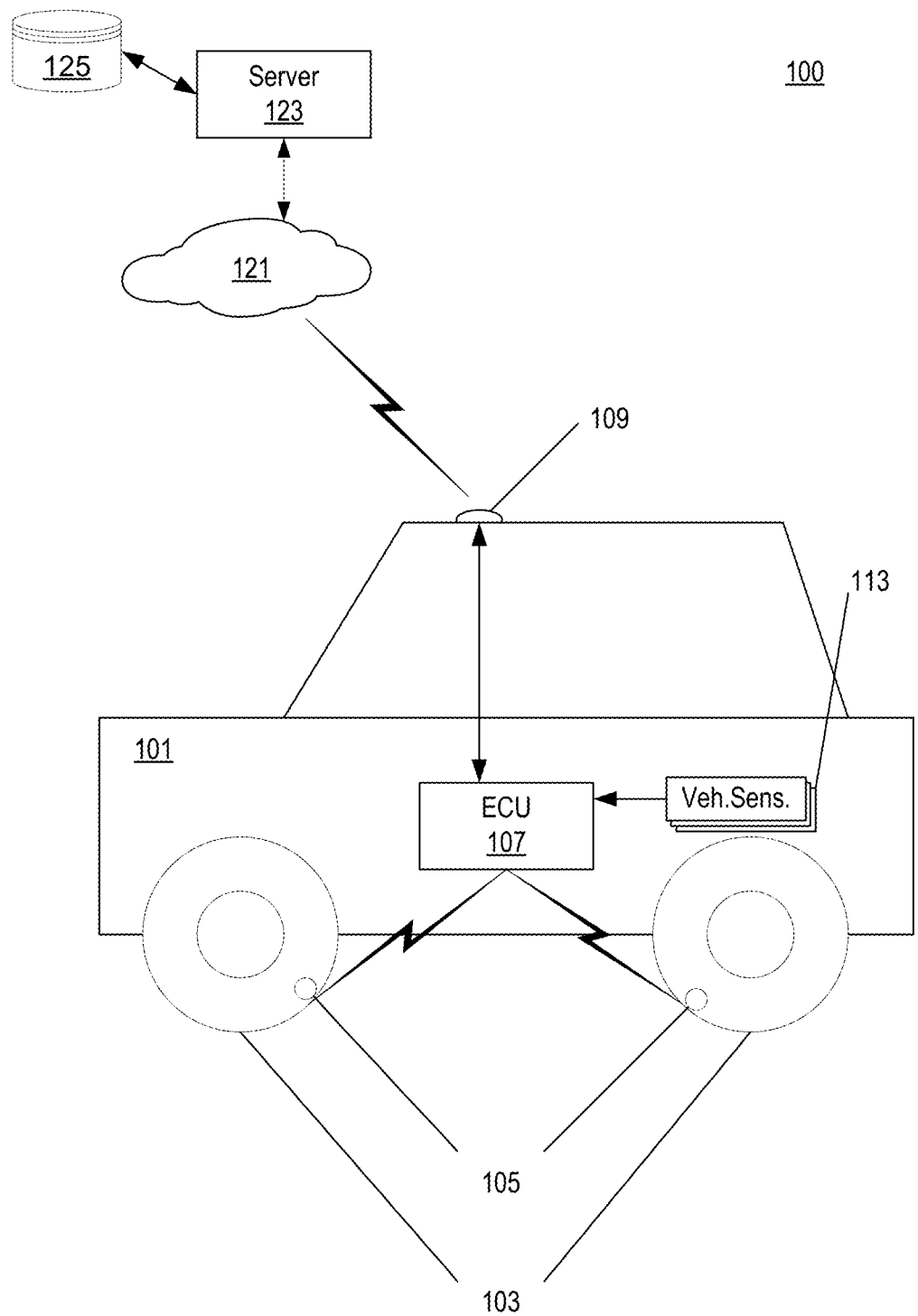
FIG. 1 sets forth a block diagram of an exemplary tire monitoring system in accordance with the present disclosure.

FIG. 1 sets forth a block diagram of an exemplary tire monitoring system (100) in accordance with the present disclosure. The system of FIG. 1 includes a vehicle (101) equipped with tires (103) that include tire mounted sensors (TMSs) (105). While the embodiment of FIG. 1 shows two tires each equipped with a TMS (105), it will be understood that as few as one, and as many as all, of the tires (103) of the vehicle (101) may include a TMS (105). The vehicle of FIG. 1 further includes a vehicle control unit (107), commonly referred to as the vehicle's "computer," which may be an electronic control unit (ECU) as shown in FIG. 1. Each TMS (105) is equipped with a wireless transceiver for bidirectional wireless communication with the ECU (107), as will be described in more detail below. The ECU (107) is similarly equipped with a wireless transceiver for bidirectional wireless communication with each of the TMSs (105), as will be described in more detail below. The bidirectional wireless communication may be realized by low power communication technology such as Bluetooth Low Energy or other low power bidirectional communication technology that is intended to conserve energy consumed. Although the ECU (107) is described as including a wireless transceiver for bidirectional wireless communication with the TMSs (105), it is understood that, in some embodiments, the ECU (107) may not need to send data to the TMSs (105). Accordingly, the ECU (107) may instead be equipped with a unidirectional wireless receiver.

The ECU (107) may be a central control unit or may refer collectively to one or more vehicle subsystems, such as an Engine Control Module (ECM), a Powertrain Control Module (PCM), a Transmission Control Module (TCM), a Brake Control Module (BCM), a Central Timing Module (CTM), a General Electronic Module (GEM), a Suspension Control Module (SCM), or a Tire Pressure Monitoring ECU. The ECU (107) may also be implemented as another type of computing device as can be appreciated, including general computers, mobile devices, etc. In an embodiment according to the present disclosure, the ECU (110) includes a BCM that includes an Antilock Braking System (ABS) and an Electronic Stability Program (ESP). Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the ECU (107), which may provide parameters based on these readings to the TMS (105).

The vehicle (101) may further include a transceiver (109) communicatively coupled to the ECU (107) for cellular terrestrial communication, satellite communication, or both. The transceiver (109) may be used to communicatively couple the ECU (107) to a cloud (121) for obtaining tire specification data, characteristic data, computational data related to cloud-based calculations, and parameters specific to the tire (103). For example, a server (123) on the cloud (121) may provide access to a database (125) of tire brands and models and their specifications and characteristics. For example, tire specifications may include tire type (e.g., passenger), width, aspect ratio, diameter, circumference, treadwear grade, traction grade, temperature grade, maximum load limit, load index, inflation limits, optimal inflation pressure, and other specifications as will be recognized by those of skill in the art. Tire characteristics may include reference models for radial force acceleration profiles, tangential force acceleration profiles, lateral force acceleration profiles, contact patch lengths, or peak radial displacements corresponding to various speeds, road terrains, tire pressures, tire loads, tire temperatures, environmental temperatures, tread wear models, and weather conditions. Furthermore, configuration parameters for the TMS (105) can be accessed from the database (125) or other locations on the cloud (121) and transmitted to the TMS (105) from the ECU (107). For example, new feature developments may require alternate processing of the accelerometric signal. The configuration parameters selected could also be changed based on GPS location or weather information, etc.

The TMS (105) may be programmed with tire identification data (e.g., wirelessly via a handheld tool). The tire identification data may be retrieved from the TMS (105) by the ECU (107), which accesses, based on the tire identification data, records from a database located internally (not shown) or on the cloud (121). From the database, parameters of the tire relevant to the application are received in the ECU (107) and then used to configure the TMS (105) through direct transmission of the parameters or some subset/function of the parameters.

The arrangement of devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, and others as will occur to those of skill in the art. Various embodiments of the present disclosure may be implemented on a variety of hardware platforms in addition to those illustrated in FIG. 1.

Figure 2:
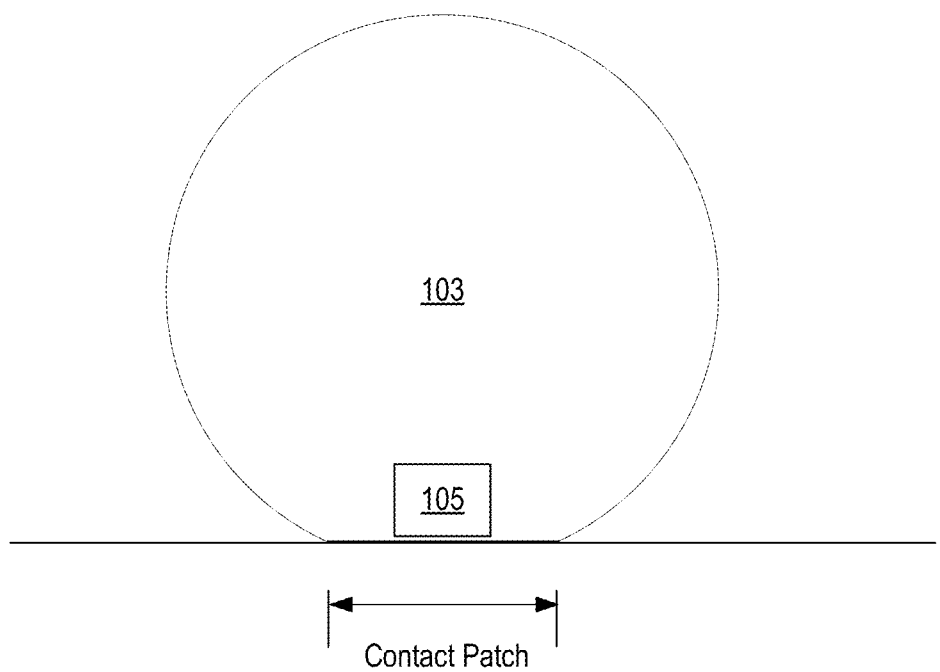
FIG. 2 illustrates a block diagram of an exemplary tire mounted sensor (TMS) in accordance with the present disclosure.

FIG. 2 illustrates a block diagram of an exemplary tire mounted sensor (TMS) (105) in accordance with the present disclosure. Typically, the TMS (105) is mounted on, or otherwise coupled to, an internal surface of the tire (103), specifically on the inside of the tread rather than the side wall. As the tire (103) rotates, the portion that engages with the road surface at any given time is flattened. The flattened portion is known as the tire footprint or, interchangeably, contact patch. One or more features of the tire (103), in particular the length of the contact patch (typically measured in the direction of travel of the vehicle), may be used, for example, as an indication of the load on the tire (103). Electrical signals produced by the TMS (105) can be used to measure the contact patch, in particular its length, as will be described in more detail below. It will be understood that one or more of the tires (103) of the vehicle (101) may each include a TMS (105) for providing one or more target signals in respect of which pulse width measuring is performed.

Figure 3:
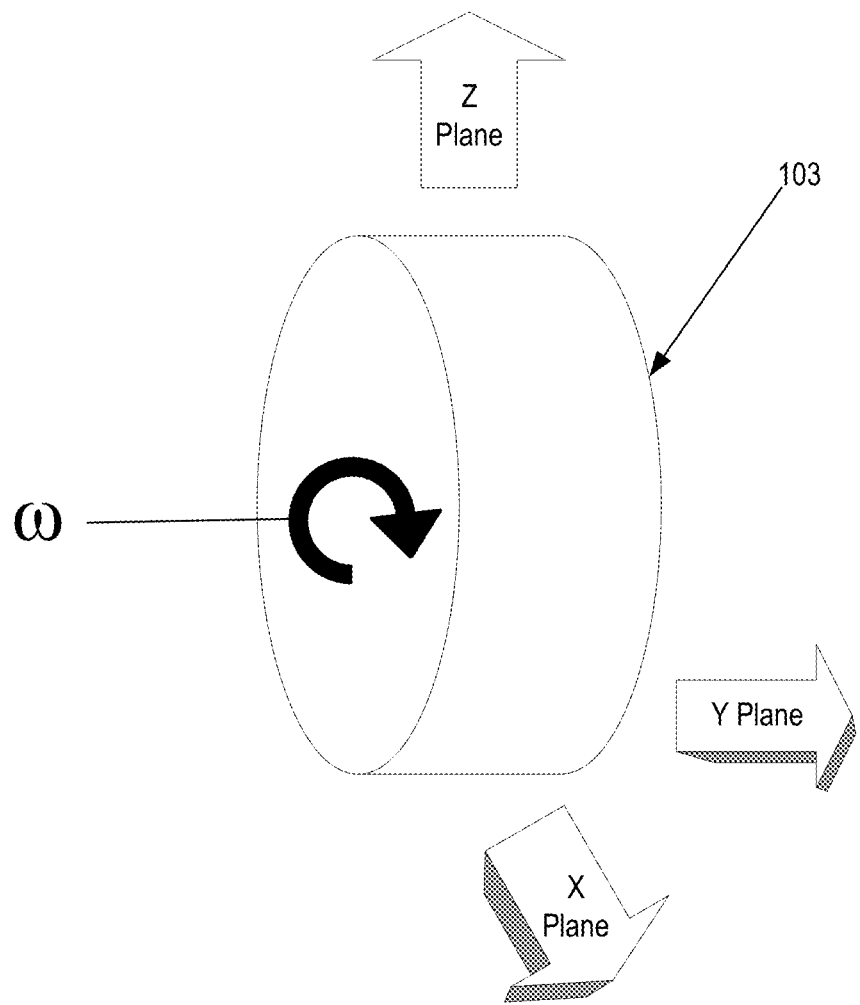
FIG. 3 illustrates a reference diagram of a tire in accordance with the present disclosure.

FIG. 3 illustrates reference diagram of a tire (103) in accordance with the present disclosure. As used in this disclosure, the z-axis of the tire (103) is the direction of radial force during rotation, the y-axis of the tire is the direction of lateral force during rotation, and the x-axis of the tire (103) is the direction of tangential force during rotation. The angular speed of rotation, in radians, is represented by $\omega$, and is also referred to herein as wheel speed.

Figure 4:
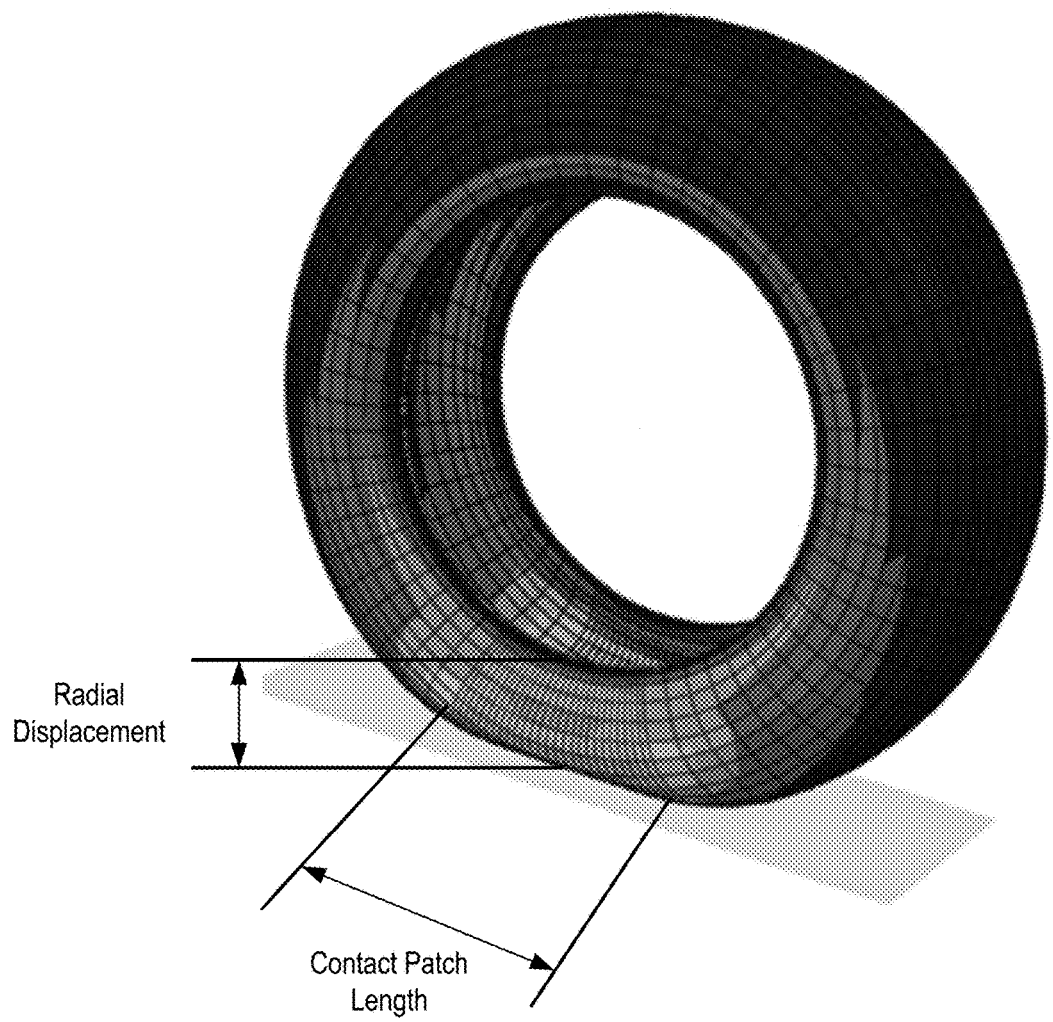
FIG. 4 illustrates tire features that may be measured using a TMS in accordance with the present disclosure.
Figure 5:
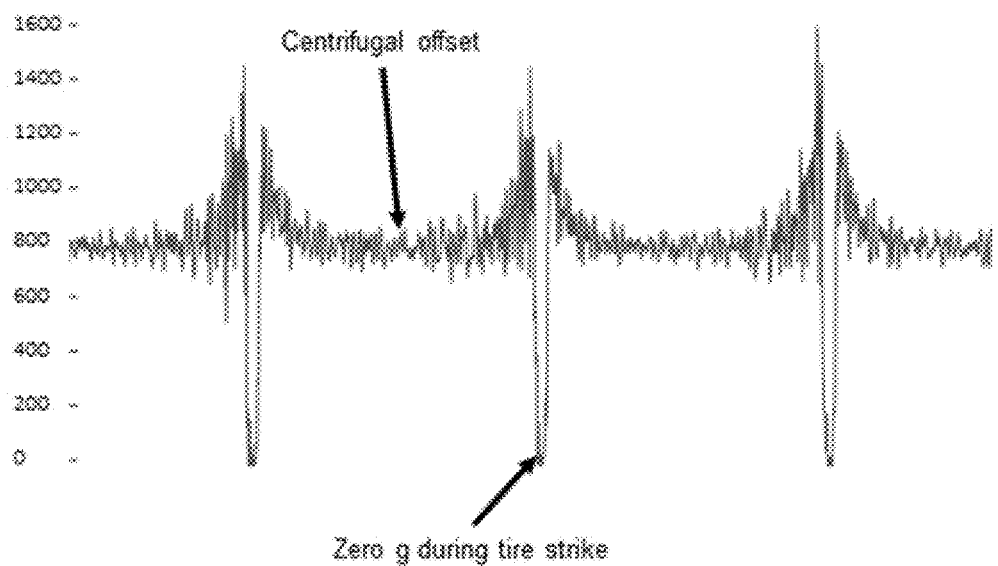
FIG. 5 illustrates an example raw accelerometric waveform.
Figure 6:
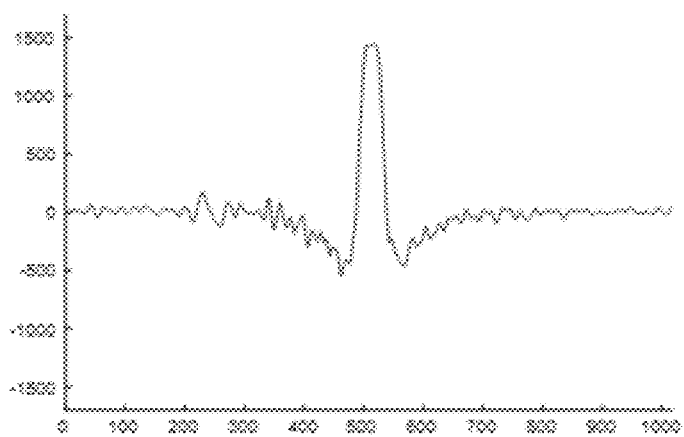
FIG. 6 illustrates an example processed accelerometric waveform.

FIG. 4 illustrates tire features that may be measured using a TMS in accordance with the present disclosure. Two tire features that are indicative of tire load are contact patch length and radial displacement, as illustrated in FIG. 4. Radial acceleration is measured using the TMS (103), which may be equipped with an accelerometer, an acceleration sensor, an accelerometric device, a shock sensor, a force sensor, a microelectromechanical systems (MEMS) sensor, or other devices that are similarly responsive to acceleration magnitude and/or to changes in acceleration. For example, an accelerometer senses acceleration in the radial plane (z-plane) (see FIG. 3). As illustrated in FIG. 5, the characteristic of the accelerometric waveform exhibits a centrifugal offset and region where the magnitude momentarily drops to zero during the time when the zone where the sensor is mounted is at tire/ground contact position. This measurement is repeated for rotations of the tire. The radial acceleration signal is then conditioned to make processing easier by isolating each strike in the acceleration profile, low-pass filtering the waveform, inverting the waveform, and normalizing the waveform for speed, the result of which is shown in FIG. 6.

Returning to FIG. 4, contact patch length (CPL) and peak radial displacement (PRD) are two tire features useful in determining the tire load. Both CPL and PRD are influenced by tire load and pressure, and, accordingly, tires may be characterized by comparing the magnitude of CPL or PRD with varying pressure and load. Characteristic equations may be stored, for example, in the TMS (105) of FIG. 1 or in the vehicle control unit (107) of FIG. 1. CPL may be estimated by measuring the time at which the radial acceleration is returning to and is at zero g. This time is then expressed as a quotient/ratio of the time for a complete rotation, and the CPL is derived from its ratio of the known tire circumference. In order to determine the PRD, the radial accelerometric signal is integrated twice with respect to time. For load estimation, either of these two methods can be used independently.

Figure 7:
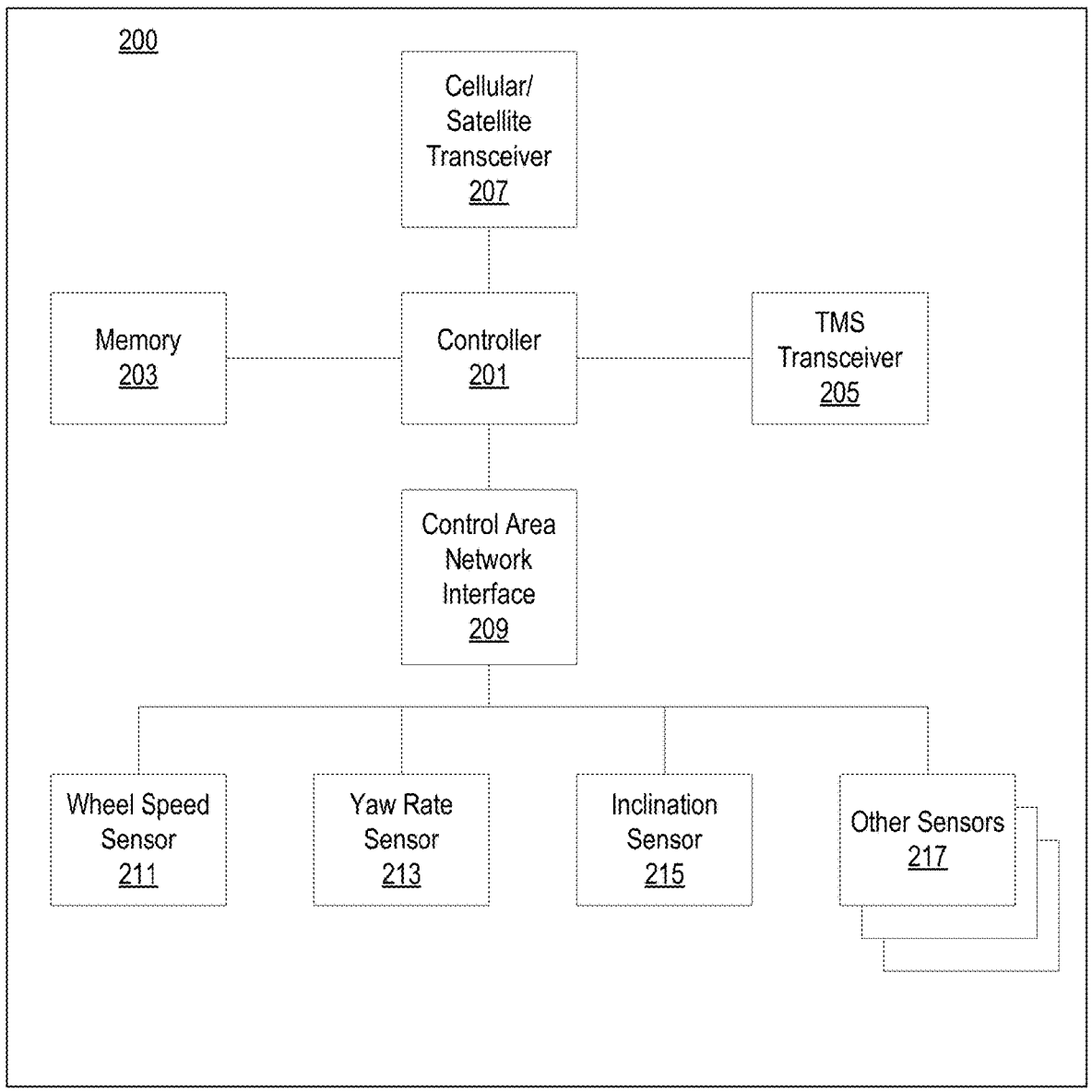
FIG. 7 illustrates a block diagram of an exemplary vehicle control system in accordance with the present disclosure.

For further explanation, FIG. 7 illustrates a block diagram of an exemplary vehicle control system (VCS) (200) in accordance with the present disclosure. The VCS (200) includes a controller (201) coupled to a memory (203). The controller (201) is configured to obtain sensor readings related to vehicle operating conditions, as well as data from sources external to the vehicle, and provide configuration parameters to a TMS, such as TMS (300) (see FIG. 8). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (203). The memory (203) may be a non-volatile memory such as flash memory.

For example, the VCS (200) may obtain vehicle operating condition data such as sensor readings from sensors on-board the vehicle. The VCS (200) may also obtain tire specification data for a tire equipped on the vehicle, such as the tire (103) of FIG. 1.

For bidirectional wireless communication with a TMS, the VCS (200) includes a TMS transceiver (205) coupled to the controller (201). In one embodiment, the TMS transceiver (205) is a Bluetooth Low Energy transmitter-receiver. In other embodiments, the TMS transceiver (205) may be other types of low power bidirectional communication technology that is intended to conserve energy consumed in the TMS.

The VCS (200) may further include a transceiver (207) for cellular terrestrial communication, satellite communication, or both. The transceiver (207) may be used to communicatively couple the VCS (200) to an external network (not shown) for obtaining tire specification data, characteristic data, and configuration parameters specific to a tire make and model.

The VCS (200) may further comprise a controller area network (CAN) interface (209) for communicatively coupling vehicle sensors and devices to the controller (201). Of particular relevance to the present disclosure, the CAN interface (209) couples a wheel speed sensor (211), a yaw rate sensor (213), an inclination sensor (215), and other sensors (217), to the controller (201). The wheel speed sensor (211) measures the rotational angular speed of the wheel, e.g., in radians per second. The yaw rate sensor (213) may be used to measure the yaw-induced acceleration of the vehicle, for example, when the vehicle is maneuvering a curve, which will influence the magnitude of loading on each tire. The yaw rate sensor (213) may also provide information on the shear forces on the tire where it contacts the road. The inclination sensor (215) may detect longitudinal and/or transverse inclination of the vehicle. The wheel speed sensor (211), the yaw rate sensor (213), and the inclination sensor (215) transmit respective readings to the controller (201).

The controller (201) is configured to communicate to the TMS when and how to process accelerometric signals. For example, the controller (201) may wait for the vehicle to achieve a steady operational state based on readings received from the wheel speed sensor (211), the yaw rate sensor (213), and the inclination sensor (215), and the other sensors (217), before requesting or initiating data readings from the TMS. A steady operational state may be determined based on defined operating ranges for tire pressure and temperature, vehicle speed and acceleration, steering angle, and road surface. For example, an ideal steady operational state may be based on detecting a constant wheel speed and/or when the acceleration, yaw, and inclination are near zero or below a predetermined threshold. By waiting for the vehicle to achieve a steady operational state, it is not necessary to operate the TMS while the TMS is processing non-stabilized data. Retrieving stabilized data from the TMS thus results in a more accurate load calculation. The TMS may also transmit a confidence factor along with a load measurement. The confidence factor may be calculated based on factors such as wheel speed, acceleration, yaw, road noise, and/or temperature. In an embodiment, the controller (201) transmits a wake-up signal to the TMS via the communication link between the TMS transceiver (205) and the TMS. Subsequent to or concurrent with the wake-up signal, the controller (201) may transmit a configuration parameter. In an embodiment, the configuration parameter is based on the wheel speed reading from the wheel speed sensor (211). For example, the configuration parameter may be the angular rotational speed of the wheel or may be the rotational period of the wheel. Other configuration parameters may include parameters based on sensor readings for yaw rate or inclination, or based on operational conditions such as, e.g., whether the windshield wipers are active (thus indicating slick road conditions).

In some embodiments, the controller (201) is further configured to receive tire feature data from the TMS, for example CPL or PRD described above. Based on the tire feature data, the processor is configured to compensate a TMS derived load for vehicle dynamics/conditions. For example, the controller 201 may compensate a tire load using a characteristic function that calculates the tire load based on tire factors such as CPL or PRD, or another deformation, as well as other factors such as tire pressure and tire stiffness. The tire stiffness may be expressed as one or more coefficients of a polynomial function (e.g., stiffness coefficients). In other embodiments, the controller (201) is configured to receive data indicating the load as calculated by the TMS or another device (e.g., a phone or mobile device).

To determine the stiffness coefficients for a given tire model, various loads and pressures can be applied to the tire using a flat track, a drum tester, a static test, or through a simulation or model. The measurements can then be used to solve for the coefficients of the polynomial function. For example, assume a polynomial function $f(x, y)=p00+p10x+p01y+p20x^2+p11xy$, where x is the inflated tire pressure, y is the applied load, and p00, p10, p01, p20, and p11 are the stiffness coefficients. The tire coefficients may then be determined by solving for the polynomial function using the test samplings. It is understood that a higher order polynomial function may also be used, resulting in additional polynomial coefficients. The stiffness coefficients may then be stored in a database or other data structure that associates a tire model identifier (e.g., a model number) with a particular set of stiffness coefficients. The database may be stored or implemented in the memory (203) of the VCS (200) or implemented in a server accessible to the VCS (200) via the cellular/satellite transceiver (207).

The controller (201) may determine a model identifier (e.g., a model number) for a tire. For example, the controller (201) may receive, via the TMS transceiver (205), a signal from the TMS encoding the model identifier for the tire. The controller (201) may then identify, in a database, one or more stiffness coefficients corresponding to the model identifier for the tire. For example, the controller (201) may query a locally stored (e.g., in memory (203)) database with the model identifier and receive, in response, the one or more stiffness coefficients. As another example, the controller (201) may send a query to a remotely disposed database via the cellular/satellite transceiver (207) and receive, in response, the one or more stiffness coefficients.

The controller (201) may then transmit, to a TMS of the tire, the one or more stiffness coefficients. For example, the controller (201) may send, via the TMS transceiver (205), a Radio Frequency (RF) signal or Bluetooth Low Energy (BLE) signal encoding the one or more tire stiffness coefficients to the TMS of the tire. The TMS receiving the one or more stiffness coefficients may comprise the TMS from which the model identifier was received, or another TMS (e.g., installed in a tire having a same model identifier as the received model identifier). Transmitting the one or more stiffness coefficients causes the TMS to store, in memory, the one or more stiffness coefficients. The TMS may then use the one or more stiffness coefficients to calculate tire load or other factors.

Figure 8:
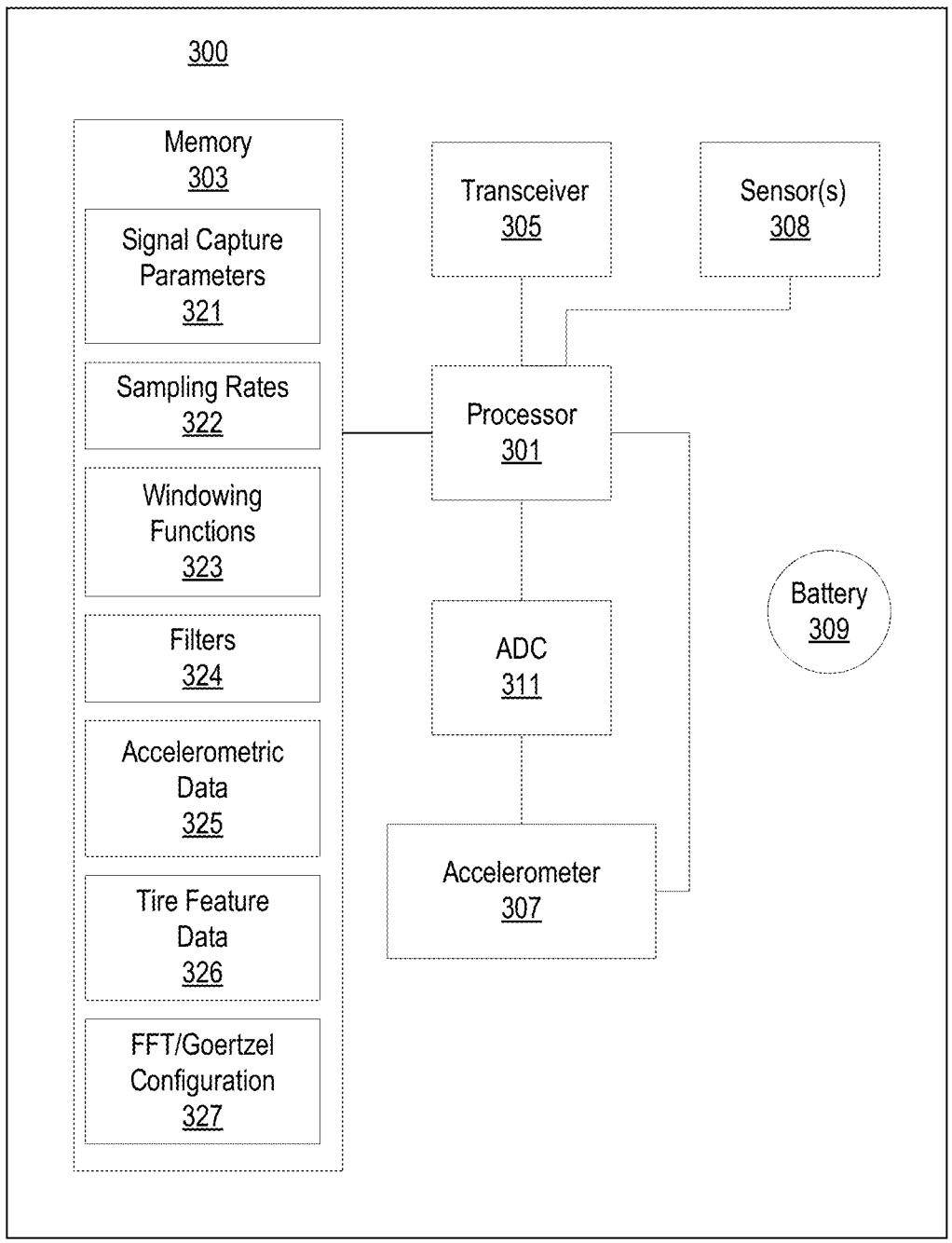
FIG. 8 illustrates a block diagram of an exemplary TMS in accordance with the present disclosure.

For further explanation, FIG. 8 illustrates a block diagram of an exemplary tire mounted sensor (TMS) (300) in accordance with the present disclosure. The TMS (300) includes a processor (301). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (300) of FIG. 8 also includes a memory (303) coupled to the processor (301). The memory may store signal capture configuration parameters (321) and other data received from the VCS (200). The memory (303) may store a sampling rates table (322) of sampling rates each corresponding to a specific parameter value, e.g., a wheel speed or rotational period of the tire. The memory (303) may also store a windowing function table (323) of windowing functions each corresponding to a specific parameter value, e.g., a wheel speed or rotational period of the tire. The memory (303) may also store a filter table (324) filter frequency bands, each corresponding to a specific parameter value, e.g., a wheel speed or rotational period of the tire. The memory (303) may also store accelerometric data (325), including a raw digital signal sampled from the accelerometer (307) by the ADC (311) and a processed accelerometric waveform processed by the processor (301). The memory (303) may also store tire feature data (326), such as an CPL or PRD extracted by the processor (301). The memory (303) may also store FFT or Goertzel algorithm configurations (327). The memory (303) may also store other data as can be appreciated, including calibration data for sensors, data associated with the vehicle (e.g., camber, slip), etc.

For bidirectional wireless communication with the VCS (200), the TMS (300) of FIG. 8 includes a transceiver (305) coupled to the processor (301). In one embodiment, the transceiver (305) is a Bluetooth Low Energy transmitter-receiver. In other embodiments, the transceiver (305) may be other types of low energy bidirectional communication technology that is intended to conserve energy consumed in the TMS (300). The TMS (300) transmits data indicating the load on the tire, tire pressure, and/or other data (e.g., data relative to trad depth, road surface conditions, etc.) to the VCS (200) via the transceiver (305).

The accelerometer (307) of FIG. 8 may also be an acceleration sensor, an accelerometric device, a shock sensor, a force sensor, a microelectromechanical systems (MEMs) sensor, or other device that is similarly responsive to acceleration magnitude and/or to changes in acceleration. For example, an accelerometer senses acceleration in the radial plane (z-plane) and/or the x-plane and outputs an electric pulse signal responsive to sensed acceleration. In an embodiment, the accelerometer (307) is configurable with an accelerometer range, a wheel speed parameter, or other vehicle parameter provided by the VCS (200). For example, g-offset can be determined via wheel speed sensor or another vehicle parameter and used to capture and process signals faster. The g-offset may also be determined by the TMS (300). Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

The TMS (300) also includes one or more sensors (308). The sensors (308) may include temperature sensors, pressure sensors, and other sensors as can be appreciated. Accordingly, the TMS (300) may measure the pressure and/or temperature of the tire and store data indicating the pressure and/or temperature in the memory (303).

The TMS (300) of FIG. 8 also includes an analog to digital converter (ADC) (311) that receives the electric pulse signals from the accelerometer (307) and samples them according to a sampling rate. The ADC (311) converts the raw analog signals received from the accelerometer (307) into a raw digital signal that is suitable for digital signal processing. The sample rate of the ADC (311) may be configured via wheel speed from the wheel speed sensor or another vehicle-provided parameter from a vehicle sensor. The TMS (300) may also determine the sample rate based on a time between detected road strikes.

The TMS (300) of FIG. 8 also includes a battery (309) connected to a power bus (not shown) to power the transceiver (305), the processor (301), the ADC (311), the accelerometer (307), and the memory (303). By waiting until a steady state indication or wake-up signal is received from the VCS (200) at the TMS (300), or waiting until a self-determined wake-up state, and by configuring the TMS with parameters from the VCS (300) to optimize processing of accelerometric data to reduce the number of road strikes needed to extract a tire feature, battery charge in the battery (309) is conserved.

In an embodiment, the rotational period of the tire is used in the signal processing of the accelerometric data by the processor (301). A windowing function after strike detection typically takes greater than 5 rotations to establish a suitable window to reduce harmonics before, e.g., a Fast Fourier Transform (FFT) or the Goertzel algorithm. Filter banks used in the signal processing should also be applied according to the speed of rotation. Utilizing the time period and other information such as flags for certain features, the windowing function can be selected and the frequency bands specified. Thus, the strike and the information can be processed more quickly and using less computational resources.

The TMS (300) may receive, via the transceiver (305), one or more stiffness coefficients. The one or more stiffness coefficients may be encoded in a signal received from a VCS (200), from a sensor programming device (400), or another device. The TMS (300) may then store, in memory (303), the one or more stiffness coefficients. The processor (301) may then access the one or more stiffness coefficients from memory (303) for use in calculating tire load, tread depth, or other tire features as can be appreciated.

Figure 9:
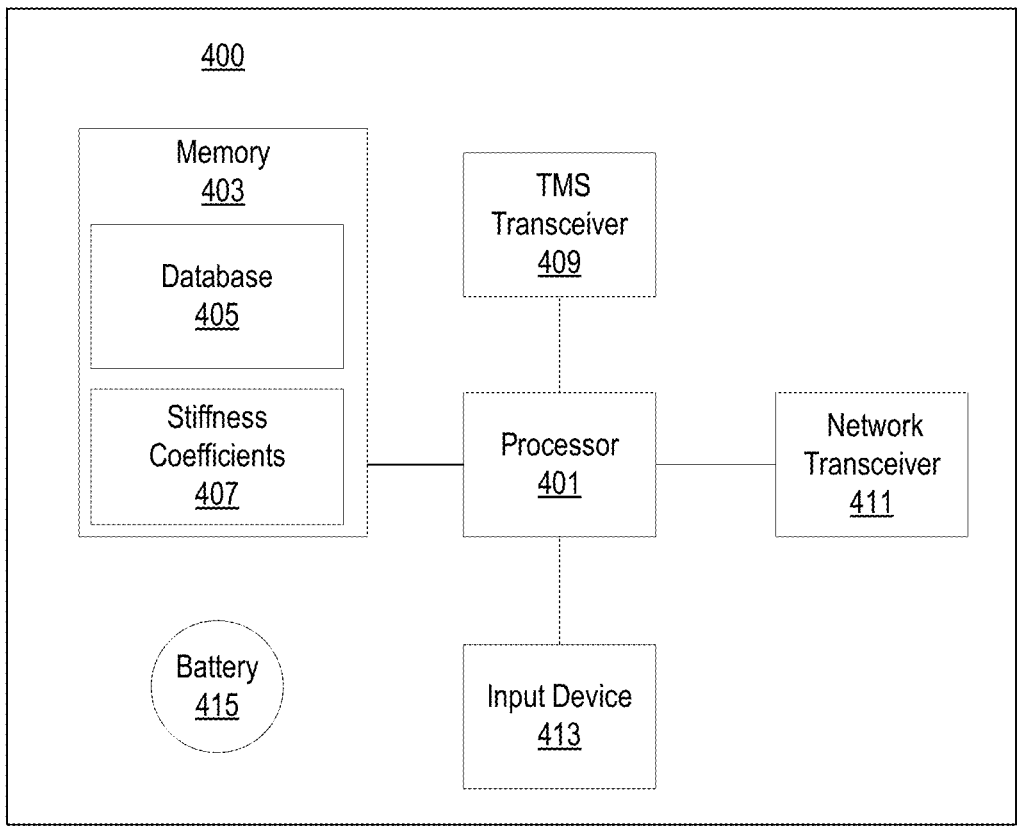
FIG. 9 illustrates a block diagram of an exemplary sensor programming device in accordance with the present disclosure.

For further explanation, FIG. 9 illustrates a block diagram of an exemplary sensor programming device (SPD) (400) in accordance with the present disclosure. The SPD (400) may be embodied as a hand-held or other portable or mobile device. The SPD (400) may also be embodied as a static device (e.g., at a manufacturing plant or facility). The SPD (400) includes a processor (401). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The SPD (400) of FIG. 9 also includes a memory (403) coupled to the processor (401). The memory (403) may store a database (405) or other data structure associating tire model identifiers (e.g., model numbers) with stiffness coefficients (407). The memory (403) may also store stiffness coefficients (407) independent of a database (405). For example, the memory (403) may store stiffness coefficients (407) downloaded from a server implementing a database (405).

For bidirectional wireless communication with the TMS (300), the SPD (400) of FIG. 9 includes a TMS transceiver (409) coupled to the processor (401). In one embodiment, the TMS transceiver (409) is a Bluetooth Low Energy transmitter-receiver. In other embodiments, the TMS transceiver (409) may be other types of low energy bidirectional communication technology, such as Radio Frequency Identification (RFID) or Low Frequency Radio Frequency Identification (LF RFID).

For bidirectional wireless communication with servers or other remotely disposed systems, the SPD (400) includes a network transceiver (411). The network transceiver (411) may facilitate cellular communications, terrestrial communications, satellite communications, Wi-Fi communications, or other wireless communications with remotely disposed computing systems as can be appreciated. For example, the processor (401) may query a database of a remotely disposed server via the network transceiver (411) and receive, in response, one or more stiffness coefficients (407).

The SPD (400) also includes an input device (413) to receive model identifiers for a tire in which a TMS (300) is installed to facilitate programming the TMS (300). For example, the input device (413) may include a keyboard, keypad, touch screen, or other device that accepts a manual input of the model identifier from a user of the SPD (400). As another example, the input device (413) includes a visual scanner, such as a barcode scanner, a camera, or other visual scanner for scanning visual encodings of the model identifier (e.g., barcodes, Quick Response (QR) codes, printed text scannable via text recognition, etc.). As a further example, the input device (413) includes an RFID scanner for scanning RFID tags on tires that indicate the model identifier for the tire. The SPD (400) of FIG. 9 also includes a battery (415) connected to a power bus (not shown) to power the components of the SPD (400).

The SPD (400) transmits, via the TMS transceiver (409), stiffness coefficients (407) to a TMS (300). To do so, processor (401) determines a model identifier (e.g., a model number) for a tire. Determining the model identifier may include receiving, by the processor (401), from the input device (413), the model identifier. For example, the model number may be indicated using printed text on a label on the tire, on an inventory or parts listing, or otherwise displayed. A camera of the input device (413) may then capture the displayed text. The processor (401) then identifies the model identifier from the text using text recognition. As another example, the model number may be included using a barcode or QR code. The input device (413) scans the barcode or QR code for decoding by the processor (401). As another example, where the input device (413) comprises an RFID reader, the input device (413) may scan an RFID tag affixed to the tire encoding the model identifier and provide the model identifier to the processor (401). As a further example, a TMS (300) of the tire may transmit the model identifier to the SPD (400) using the TMS transceiver (409). The model number may also be manually input.

The SPD (400) then identifies, in a database (405), one or more stiffness coefficients (407) corresponding to the model identifier of the tire. For example, the processor (401) may query a locally stored (e.g., in memory (403)) database (405) with the model identifier and receive, in response, the one or more stiffness coefficients. As another example, the processor (401) may send a query to a remotely disposed database via the network transceiver (411) and receive, in response, the one or more stiffness coefficients (407).

The processor (401) may then transmit, to a TMS (300) of the tire, via the TMS transceiver (409) the one or more stiffness coefficients (407). Transmitting the one or more stiffness coefficients (407) causes the TMS (300) to store, in memory (303), the one or more stiffness coefficients (407). The TMS (300) may then use the one or more stiffness coefficients (407) to calculate tire load or other tire features.

The one or more stiffness coefficients may also be transmitted to other devices (e.g., devices configured to calculate tire load) such as a VCS (200), a mobile device, and/or a cloud-computing environment.

Figure 10:
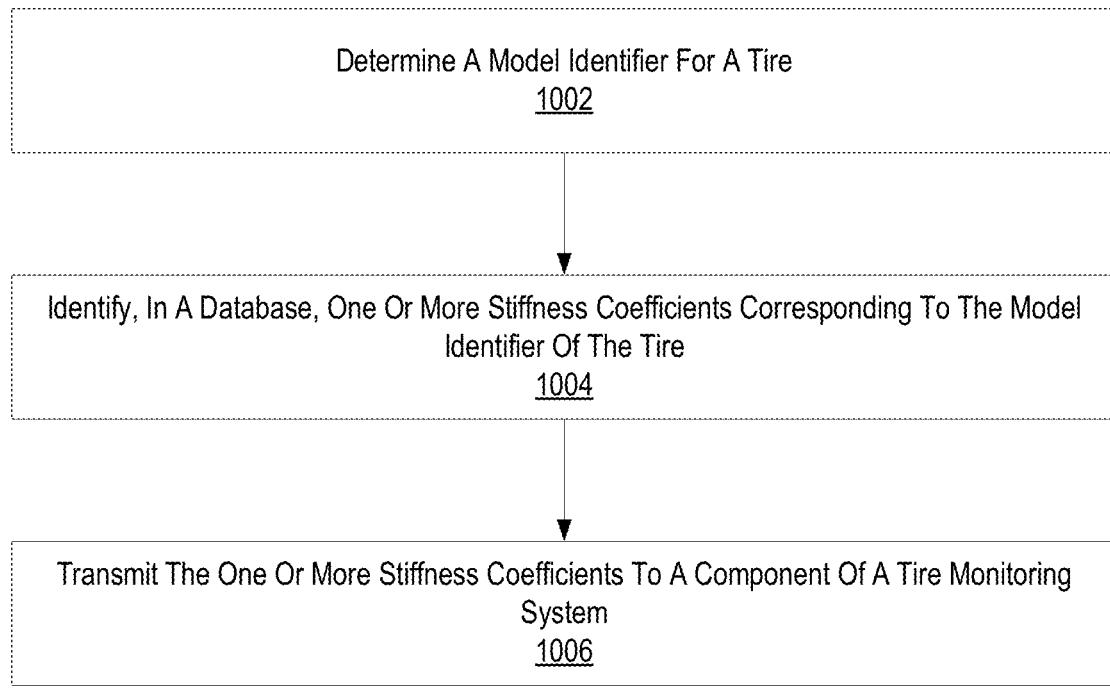
FIG. 10 is a flowchart to illustrate an implementation of a method of configuring a tire monitoring system in accordance with the present disclosure.

For further explanation, FIG. 10 is a flowchart to illustrate an implementation of a method of configuring a tire monitoring system in accordance with the present disclosure. The method of FIG. 10 includes determining (1002) (e.g., by a controller (201) of a VCS (200), by a processor (401) of a SPD (400), a model identifier (e.g., a model number) for a tire. Where determining (1002) the model identifier is performed by a processor (401) of an SPD (400), determining (1002) the model identifier may include receiving, by the processor (401), from an input device (413), the model identifier. For example, the model number may be indicated using printed text on a label on the tire, on an inventory or parts listing, or otherwise displayed. A camera of the input device (413) may then capture the displayed text. The processor (401) then identifies the model identifier from the text using text recognition. As another example, the model number may be included using a barcode or QR code. The input device (413) scans the barcode or QR code for decoding by the processor (401). As another example, where the input device (413) comprises an RFID reader, the input device (413) may scan an RFID tag affixed to the tire encoding the model identifier and provide the model identifier to the processor (401). As a further example, a TMS (300) of the tire may transmit the model identifier to the SPD (400) using the TMS transceiver (409). Where determining (1002) the model identifier is performed by a controller (201) of a VCS (200), determining (1002) the model identifier may include receiving, via a TMS transceiver (205), from a transceiver (305) of the TMS (300), the model identifier. For example, the model identifier may be received as a Radio Frequency signal or Bluetooth Low Energy signal encoding the model identifier.

The method of FIG. 10 also includes identifying (1004), in a database, one or more stiffness coefficients (407) corresponding to the model identifier of the tire. Identifying (1004) the one or more stiffness coefficients may include querying a locally stored (e.g., in memory (403) of a SPD (400), in memory (203) of a VCS (200)) database (405) with the model identifier and receive, in response, the one or more stiffness coefficients (407). As another example, identifying (1004) the one or more stiffness coefficients may include sending a query to a remotely disposed database (e.g., via the network transceiver (411) of a SPD (400), via a cellular/satellite transceiver (207) of a VCS (200)) and receive, in response, the one or more stiffness coefficients (407). The remotely disposed database may include a database in a remote server or cloud computing environment, in a mobile device, etc.

The method of FIG. 10 also includes transmitting (1006) (e.g., via a TMS transceiver (409) of an SPD (400), via a TMS transceiver (205) of a VCS (200)), to a TMS (300) of the tire, the one or more stiffness coefficients (407). Transmitting (1006) the one or more stiffness coefficients (407) causes the TMS (300) to store, in memory (303), the one or more stiffness coefficients (407). The TMS (300) may then use the one or more stiffness coefficients (407) to calculate tire load or other tire features. Alternatively, the TMS (300) may transmit the stiffness coefficients to the VCS (200) to facilitate calculation of the tire load or other tire features by the VCS (200).

Figure 11:
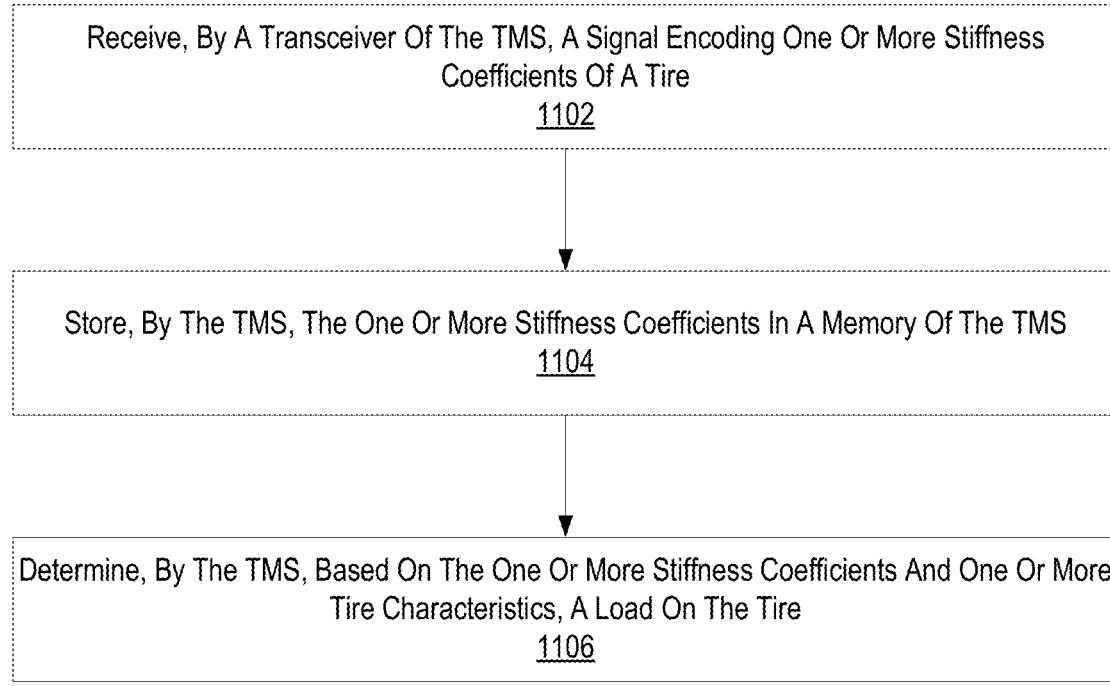
FIG. 11 is a flowchart to illustrate an implementation of another method of configuring a tire monitoring system in accordance with the present disclosure.

For further explanation, FIG. 11 is a flowchart to illustrate an implementation of another method of configuring a tire monitoring system in accordance with the present disclosure. The method of FIG. 11 includes receiving (1102), by a transceiver (305) of a TMS (300), a signal encoding one or more stiffness coefficients (407) of a tire. For example, the signal may be received from a TMS transceiver (409) of an SPD (400), from a TMS transceiver (205) of a VCS (200), or from another source. The method of FIG. 11 also includes storing (1104), by the TMS (300), the one or more stiffness coefficients (407) in a memory (303) of the TMS. The method of FIG. 11 also includes determining (1106), by the TMS (300), based on the one or more stiffness coefficients (407) and one or more tire characteristics, a load on the tire. Thus, the TMS (300) can be dynamically configured to determine or account for a load on the tire using tire-specific stiffness coefficients. The one or more tire characteristics may include, for example, a temperature of the tire, a pressure of the tire, and/or a speed of the tire. In some embodiments, one or more of the tire characteristics are measured by the TMS (300). In other embodiments, one or more of the tire characteristics are measured by another sensor and transmitted to the TMS (300).

Figure 12:
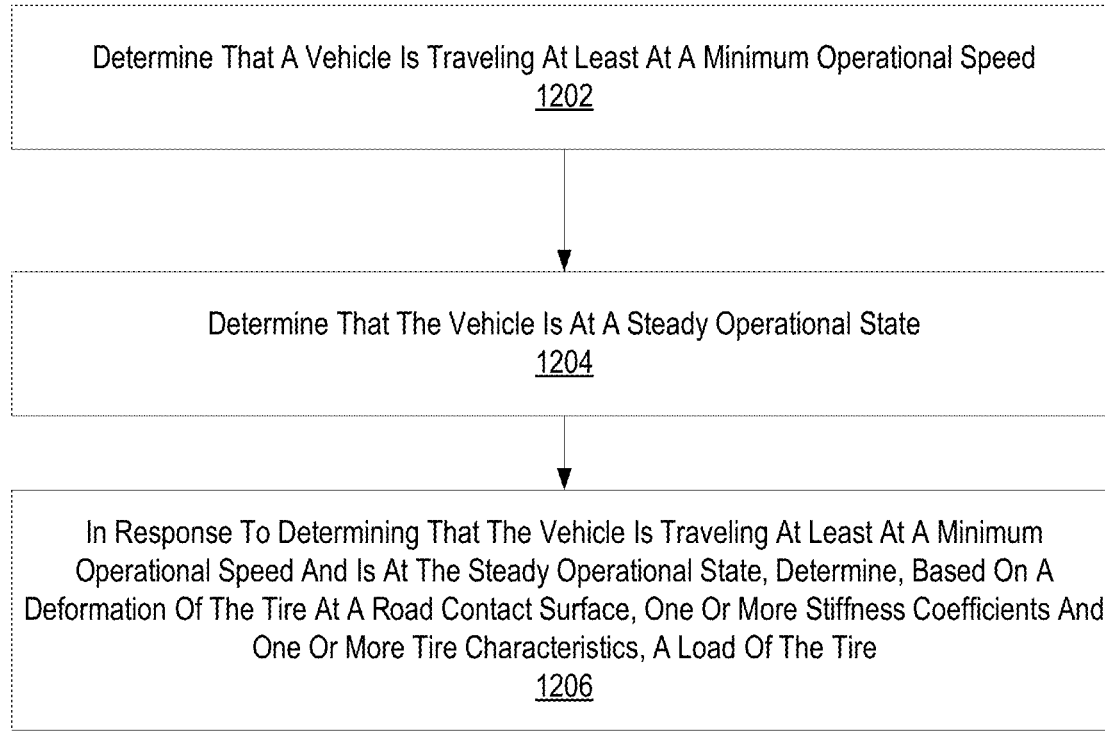
FIG. 12 is a flowchart to illustrate an implementation of another method of configuring a tire monitoring system in accordance with the present disclosure.

For further explanation, FIG. 12 is a flowchart to illustrate an implementation of another method of configuring a tire monitoring system in accordance with the present disclosure. The method of FIG. 12 includes determining (1202), by a component (e.g., a TMS (300), VCS (200)) of a tire monitoring system that a vehicle is traveling at least at a minimum operational speed. The vehicle includes the tire in which the TMS (300) is installed. The minimum operational speed may include a configurable parameter defined in the TMS (300) and/or the VCS (200). Determining (1202) that the vehicle is traveling at least at a minimum operational speed may include determining, based on accelerometric data measured by the TMS (300), that the vehicle has reached a minimum operational speed. Determining (1202) that the vehicle is at a minimum operational speed may include receiving a signal (e.g., from a TMS (300), VCS (200)) that the vehicle has reached a minimum operational speed.

The method of FIG. 12 also includes determining (1204), by a component (e.g., a TMS (300), VCS (200)) of the tire monitoring system, that the vehicle is at a steady operational state. In some embodiments, determining (1204) that the vehicle is at a steady operational state includes measuring a radial deformation of the tire (e.g., based on a CPL, PRD, etc.) over time and determining that a radial deformation variance falls below a threshold. The radial deformation variance may be determined relative to time and/or a number of tire rotations. In other embodiments, determining (1204) that the vehicle is at a steady operational state includes receiving a signal (e.g., from a TMS (300) or VCS (200)) that the vehicle is at a steady operational state. For example, the VCS (200) may send the signal in response to determining that a variance in one or more operational parameters (e.g., velocity, inclination, steering angle) falls below a threshold.

The method of FIG. 12 also includes in response to determining that the vehicle is traveling at least at a minimum operating speed and at a steady operational state, determining (1206), based on a deformation of the tire at a road contact surface, one or more stiffness coefficients, and one or more tire characteristics, a load on the tire. The one or more tire characteristics may include a temperature of the tire, a pressure of the tire, and/or a speed of the tire. The one or more stiffness coefficients may be stored in the TMS (300) as described above. For example, a characteristic equation may be used to calculate load of a tire by accepting, as inputs to the equation, a measured radial deformation, the stiffness coefficients, and the one or more tire characteristics. In some embodiments, the load is calculated by the TMS (300) and transmitted to the VCS (200). In other embodiments, the load is calculated by the VCS (200) based on one or more values received from the TMS (300) (e.g., the radial deformation, the one or more tire characteristics, and/or the one or more stiffness coefficients).

The load on the tire may be further determined based on a load error factor to compensate for a load value derived from the characteristic equation. The load error factor may be determined by and/or applied by the TMS (300) or the VCS (200). The load error factor may be calculated using one or more other characteristic equations based on drive time, number of tire rotations since vehicle start or a lifetime of the tire, the temperature of the tire, etc. The load error factor may then be applied to the previously derived load value to determine a more accurately calculated load value. The characteristic equations to determine the load on the tire and/or the load error factor may be updated using bi-directional communications of the TMS (300) (e.g., using the VCS (200) as an intermediary) with servers or cloud services.

Figure 13:
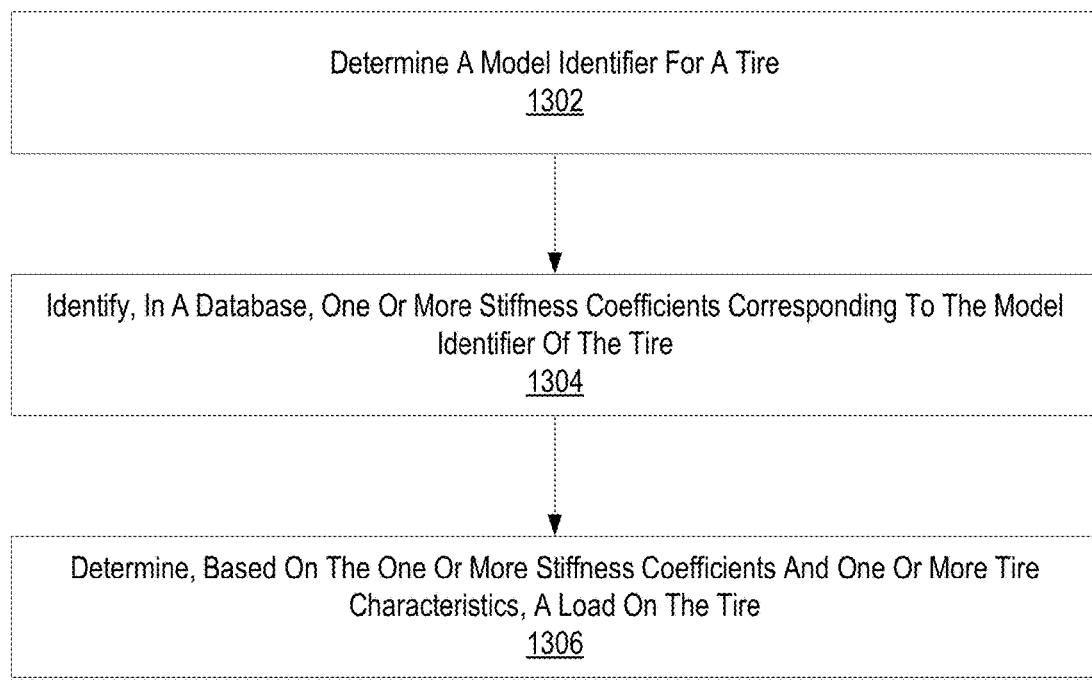
FIG. 13 is a flowchart to illustrate an implementation of another method of configuring a tire monitoring system in accordance with the present disclosure.

For further explanation, FIG. 13 is a flowchart to illustrate an implementation of another method of configuring a tire monitoring system in accordance with the present disclosure. The method of FIG. 13 includes determining (1302) (e.g., by a controller (201) of a VCS (200), by a processor (401) of an SPD (400)), a model identifier (e.g., a model number) for a tire. Where determining (1302) the model identifier is performed by a processor (401) of an SPD (400), determining (1002) the model identifier may include receiving, by the processor (401), from an input device (413), the model identifier. For example, the model number may be indicated using printed text on a label on the tire, on an inventory or parts listing, or otherwise displayed. A camera of the input device (413) may then capture the displayed text. The processor (401) then identifies the model identifier from the text using text recognition. As another example, the model number may be included using a barcode or QR code. The input device (413) scans the barcode or QR code for decoding by the processor (401). As another example, where the input device (413) comprises an RFID reader, the input device (413) may scan an RFID tag affixed to the tire encoding the model identifier and provide the model identifier to the processor (401). As a further example, a TMS (300) of the tire may transmit the model identifier to the SPD (400) using the TMS transceiver (409). Where determining (1302) the model identifier is performed by a controller (201) of a VCS (200), determining (1302) the model identifier may include receiving, via a TMS transceiver (205), from a transceiver (305) of the TMS (300), the model identifier. For example, the model identifier may be received as a Radio Frequency signal or Bluetooth Low Energy signal encoding the model identifier.

The method of FIG. 13 also includes identifying (1304), in a database, one or more stiffness coefficients (407) corresponding to the model identifier of the tire. Identifying (1304) the one or more stiffness coefficients may include querying a locally stored (e.g., in memory (403) of a SPD (400), in memory (203) of a VCS (200)) database (405) with the model identifier and receive, in response, the one or more stiffness coefficients (407). As another example, identifying (1304) the one or more stiffness coefficients may include sending a query to a remotely disposed database (e.g., via the network transceiver (411) of a SPD (400), via a cellular/satellite transceiver (207) of a VCS (200)) and receive, in response, the one or more stiffness coefficients (407). The remotely disposed database may include a database in a remote server or cloud computing environment, in a mobile device, etc.

The method of FIG. 13 also includes determining (1306), based on the one or more stiffness coefficients (407) and one or more tire characteristics, a load on the tire. The one or more tire characteristics may include a temperature of the tire, a pressure of the tire, and/or a speed of the tire. The one or more stiffness coefficients may be stored in the TMS (300) as described above. For example, a characteristic equation may be used to calculate load of a tire by accepting, as inputs to the equation, a measured radial deformation, the stiffness coefficients, and the one or more tire characteristics. In some embodiments, the load is calculated by the TMS (300) and transmitted to the VCS (200). In other embodiments, the load is calculated by the VCS (200) based on one or more values received from the TMS (300) (e.g., the radial deformation, the one or more tire characteristics, and/or the one or more stiffness coefficients).

The load on the tire may be further determined based on a load error factor to compensate for a load value derived from the characteristic equation. The load error factor may be determined by and/or applied by the TMS (300) or the VCS (200). The load error factor may be calculated using one or more other characteristic equations based on drive time, number of tire rotations since vehicle start or a lifetime of the tire, the temperature of the tire, etc. The load error factor may then be applied to the previously derived load value to determine a more accurately calculated load value. The characteristic equations to determine the load on the tire and/or the load error factor may be updated using bi-directional communications of the TMS (300) (e.g., using the VCS (200) as an intermediary) with servers or cloud services.

In view of the explanations set forth above, readers will recognize that the benefits of configuring a tire monitoring system according to embodiments of the present disclosure include, but are not limited to:

Tire mounted sensors can be programmed with tire-specific stiffness coefficients, improving the accuracy of measurements made by the tire mounted sensors.

Tire mounted sensors can be programmed after installation in a tire, eliminating the need to replace tire mounted sensors to achieve updated performance.

Exemplary embodiments of the present invention are described largely in the context of a fully functional computer system for configuring a tire monitoring system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of configuring a tire monitoring system, the method comprising:
    determining a model identifier for a tire;
    identifying, in a database, one or more stiffness coefficients corresponding to the model identifier of the tire; and
    transmitting the one or more stiffness coefficients to a component of the tire monitoring system.

2. The method of claim 1, wherein determining the model identifier for the tire includes receiving from the TMS, by a vehicle control system (VCS), a signal encoding the model identifier for the tire.

3. The method of claim 1, wherein determining the model identifier for a tire comprises scanning, by a sensor programming device, a visual encoding of a model number of the tire.

4. The method of claim 1, wherein determining the model identifier for a tire comprises receiving, by a sensor programming device, a Radio Frequency Identification (RFID) signal comprising a model number of the tire.

5. The method of claim 1, wherein identifying, in the database, the one or more stiffness coefficients comprises querying a locally stored database with the model identifier for the one or more stiffness coefficients.

6. The method of claim 1, wherein identifying, in the database, the one or more stiffness coefficients comprises:
    sending, to a server implementing a remotely disposed database, a query comprising the model identifier; and
    downloading, in response to the query, the one or more stiffness coefficients.

7. The method of claim 1, wherein transmitting the one or more stiffness coefficients to the component of the tire monitoring system includes transmitting, to a tire mounted sensor (TMS) of the tire monitoring system, the one or more stiffness coefficients which causes the TMS to store the one or more stiffness coefficients in a memory of the TMS.

8. The method of claim 1 wherein transmitting the one or more stiffness coefficients to the component of the tire monitoring system includes transmitting the one or more stiffness coefficients to one or more of a VCS, a mobile device, or a cloud-computing environment.

9. The method of claim 1, wherein transmitting the one or more stiffness coefficients to the component of the tire monitoring system includes transmitting to a transceiver of the TMS, by a sensor programming device, via one or more of a Low Frequency Radio Frequency Identification (LF RFID) write or a Bluetooth Low Energy (BLE) signal, the one or more stiffness coefficients.

10. The method of claim 1, wherein transmitting the one or more stiffness coefficients to the component of the tire monitoring system includes transmitting to a transceiver of the TMS, by a VCS, via a radio frequency (RF) channel, the one or more stiffness coefficients.

11. An apparatus for configuring a tire monitoring system, the apparatus comprising:
    a processor; and
    a memory coupled to the processor, the memory storing instructions that when executed by the processor cause the apparatus to:
        determine a model identifier for a tire;
        identify, in a database, one or more stiffness coefficients corresponding to the model identifier of the tire; and
        transmit the one or more stiffness coefficients to a component of the tire monitoring system.

12. The apparatus of claim 11, wherein determining the model identifier for the tire includes receiving from the TMS, by a vehicle control system (VCS), a signal encoding the model identifier for the tire.

13. The apparatus of claim 11, wherein determining the model identifier for a tire comprises scanning, by a sensor programming device, a visual encoding of a model number of the tire.

14. The apparatus of claim 11, wherein determining the model identifier for a tire comprises receiving, by a sensor programming device, a Radio Frequency Identification (RFID) signal comprising a model number of the tire.

15. The apparatus of claim 11, wherein identifying, in the database, the one or more stiffness coefficients comprises querying a locally stored database with the model identifier for the one or more stiffness coefficients.

16. The apparatus of claim 11, wherein identifying, in the database, the one or more stiffness coefficients comprises:
    sending, to a server implementing a remotely disposed database, a query comprising the model identifier; and
    downloading, in response to the query, the one or more stiffness coefficients.

17. The apparatus of claim 11, wherein transmitting the one or more stiffness coefficients to the component of the tire monitoring system includes transmitting, to a tire mounted sensor (TMS) of the tire monitoring system, the one or more stiffness coefficients which causes the TMS to store the one or more stiffness coefficients in a memory of the TMS.

18. The apparatus of claim 11, wherein transmitting the one or more stiffness coefficients to the component of the tire monitoring system includes transmitting the one or more stiffness coefficients to one or more of a VCS, a mobile device, or a cloud-computing environment.

19. The apparatus of claim 11, wherein transmitting the one or more stiffness coefficients to the component of the tire monitoring system includes transmitting to a transceiver of the TMS, by a sensor programming device, via one or more of a Low Frequency Radio Frequency Identification (LF RFID) write or a Bluetooth Low Energy (BLE) signal, the one or more stiffness coefficients.

20. The apparatus of claim 11, wherein transmitting the one or more stiffness coefficients to the component of the tire monitoring system includes transmitting to a transceiver of the TMS, by a VCS, via a radio frequency (RF) channel, the one or more stiffness coefficients.

21. A method of configuring a tire monitoring system, the method comprising:
    determining a model identifier for a tire;
    identifying, in a database, one or more stiffness coefficients corresponding to the model identifier of the tire; and
    determining, based on the one or more stiffness coefficients and one or more tire characteristics, a load of the tire.

22. An apparatus for configuring a tire monitoring system, the apparatus comprising:
    a processor; and
    a memory coupled to the processor, the memory storing instructions that when executed by the processor cause the apparatus to:
        determine a model identifier for a tire;
        identify, in a database, one or more stiffness coefficients corresponding to the model identifier of the tire; and
        determine, based on the one or more stiffness coefficients and one or more tire characteristics, a load of the tire.

23. A method of configuring a tire monitoring system, the method comprising:

receiving, by a transceiver of the TMS, a signal encoding one or more stiffness coefficients of a tire;

storing, by the TMS, the one or more stiffness coefficients in a memory of the tire mounted sensor; and determining, by the TMS, based on the one or more stiffness coefficients and one or more tire characteristics, a load on the tire.

24. A tire mounted sensor (TMS) configured to:

receive, via a transceiver of the TMS, a signal encoding one or more stiffness coefficients of a tire;

store the one or more stiffness coefficients in a memory of the TMS; and determine, based on the one or more stiffness coefficients and one or more tire characteristics, a load on the tire.

* * * * *